(12) United States Patent
Maehara

(10) Patent No.: US 7,423,351 B2
(45) Date of Patent: Sep. 9, 2008

(54) VEHICLE-GENERATOR CONTROL DEVICE

(75) Inventor: Fuyuki Maehara, Nagoya (JP)

(73) Assignee: Denso Corporation, Kariya (JP)

( * ) Notice: Subject to any disclaimer, the term of this patent is extended or adjusted under 35 U.S.C. 154(b) by 28 days.

(21) Appl. No.: 11/544,707

(22) Filed: Oct. 10, 2006

(65) Prior Publication Data

US 2007/0085512 A1    Apr. 19, 2007

(30) Foreign Application Priority Data

Oct. 14, 2005    (JP)    ............................. 2005-299965

(51) Int. Cl.
| F02D 29/06 | (2006.01) |
| H02P 9/04 | (2006.01) |
| H02P 9/00 | (2006.01) |
| H02P 11/00 | (2006.01) |
| H02H 7/06 | (2006.01) |

(52) U.S. Cl. ....................................... 290/40 C; 322/28
(58) Field of Classification Search ............... 290/40 C; 322/28
See application file for complete search history.

(56) References Cited

U.S. PATENT DOCUMENTS

| 3,654,541 | A | * | 4/1972 | Kelley et al. ................... 365/54 |
| 3,887,859 | A | * | 6/1975 | Hubner ........................ 318/810 |
| 3,902,073 | A | * | 8/1975 | Lafuze .......................... 290/46 |
| 3,908,130 | A | * | 9/1975 | Lafuze .......................... 290/46 |
| 4,023,083 | A | * | 5/1977 | Plunkett ...................... 318/802 |
| 4,041,361 | A | * | 8/1977 | Cornell ........................ 318/802 |
| 4,230,979 | A | * | 10/1980 | Espelage et al. ............. 318/721 |
| 4,281,276 | A | * | 7/1981 | Cutler et al. ................. 318/803 |
| 4,322,671 | A | * | 3/1982 | Kawada et al. ............... 318/798 |
| 4,379,990 | A | * | 4/1983 | Sievers et al. .................. 322/99 |
| 4,437,051 | A | * | 3/1984 | Muto et al. ................... 318/808 |
| 4,524,310 | A | * | 6/1985 | Nagase et al. ................ 318/808 |
| 4,565,953 | A | * | 1/1986 | Espelage et al. ............. 388/813 |
| 4,567,408 | A | * | 1/1986 | Mitsuhashi .................. 388/813 |
| 4,658,192 | A | * | 4/1987 | Casteel et al. ................ 318/257 |
| 4,672,287 | A | * | 6/1987 | Fujioka et al. ............... 318/806 |
| 4,678,248 | A | * | 7/1987 | Depenbrock ................. 318/805 |
| 4,686,617 | A | * | 8/1987 | Colton ........................ 363/56.1 |
| 4,764,838 | A | * | 8/1988 | MacFarlane .................. 361/21 |
| 5,001,619 | A | * | 3/1991 | Nakajima et al. .............. 363/41 |
| 5,066,899 | A | * | 11/1991 | Nashiki ....................... 318/807 |
| 5,140,253 | A | * | 8/1992 | Itoh ............................. 322/28 |
| 5,173,654 | A | * | 12/1992 | Boella et al. .................. 322/25 |
| 5,177,428 | A | * | 1/1993 | Hirose et al. ................. 323/207 |

(Continued)

FOREIGN PATENT DOCUMENTS

JP    A 2003-153596    5/2003

(Continued)

Primary Examiner—Julio Gonzalez
Assistant Examiner—Pedro J Cuevas
(74) Attorney, Agent, or Firm—Oliff & Berridge, PLC

(57) ABSTRACT

The vehicle-generator control device for controlling an output voltage of a vehicle generator by on/off-controlling an excitation current flowing into an excitation winding of the vehicle generator, includes an excitation current detecting circuit detecting an excitation current flowing into the excitation winding, and a computation circuit having a first function of correcting the excitation current detected by the excitation current detecting circuit on the basis of a current flowing into an electrical load applied with the output voltage of the vehicle generator, and a second function of calculating an output current of the vehicle generator on the basis of the excitation current.

7 Claims, 6 Drawing Sheets

U.S. PATENT DOCUMENTS

| | | | | |
|---|---|---|---|---|
| 5,289,105 | A * | 2/1994 | Boella et al. | 322/25 |
| 5,319,299 | A * | 6/1994 | Maehara | 322/28 |
| 5,341,081 | A * | 8/1994 | Yamada | 318/800 |
| 5,416,398 | A * | 5/1995 | Blatter | 318/700 |
| 5,450,310 | A * | 9/1995 | Kawakami | 363/96 |
| 5,587,641 | A * | 12/1996 | Rozman | 318/801 |
| 5,621,633 | A * | 4/1997 | Tanomura et al. | 363/97 |
| 5,644,206 | A * | 7/1997 | Yura | 318/807 |
| 5,663,631 | A * | 9/1997 | Kajiura et al. | 322/29 |
| 5,867,376 | A * | 2/1999 | Nakamura et al. | 363/56.01 |
| 5,880,572 | A * | 3/1999 | Tajima et al. | 318/800 |
| 5,886,500 | A * | 3/1999 | Iwatani et al. | 320/104 |
| 5,963,007 | A * | 10/1999 | Toyozawa et al. | 318/799 |
| 6,163,130 | A * | 12/2000 | Neko et al. | 318/806 |
| 6,166,514 | A * | 12/2000 | Ando et al. | 318/811 |
| 6,452,357 | B1 * | 9/2002 | Jahkonen | 318/721 |
| 6,456,909 | B1 * | 9/2002 | Shimada et al. | 701/22 |
| 6,462,516 | B1 * | 10/2002 | Watanabe | 322/28 |
| 6,469,463 | B2 * | 10/2002 | Chen et al. | 318/439 |
| 6,734,653 | B2 * | 5/2004 | Taniguchi et al. | 322/24 |
| 6,777,905 | B2 | 8/2004 | Maehara | 318/650 |
| 6,788,024 | B2 * | 9/2004 | Kaneko et al. | 318/807 |
| 6,803,747 | B2 * | 10/2004 | Taniguchi et al. | 322/28 |
| 6,815,933 | B2 * | 11/2004 | Taniguchi et al. | 322/28 |
| 6,844,697 | B2 * | 1/2005 | Masaki et al. | 318/721 |
| 6,900,618 | B2 | 5/2005 | Maehara | 322/28 |
| 6,958,586 | B2 * | 10/2005 | Tanimoto | 318/254 |
| 7,005,825 | B2 * | 2/2006 | Eguchi | 318/727 |
| 7,015,594 | B2 * | 3/2006 | Asada | 290/40 R |
| 7,078,881 | B2 * | 7/2006 | Aoyama | 322/28 |
| 7,098,628 | B2 * | 8/2006 | Maehara et al. | 322/24 |
| 7,170,263 | B2 * | 1/2007 | Yamamoto et al. | 322/59 |
| 7,187,155 | B2 * | 3/2007 | Matsuo et al. | 318/807 |
| 7,227,272 | B2 * | 6/2007 | Asada et al. | 290/40 A |
| 7,235,952 | B2 * | 6/2007 | Maehara | 322/24 |
| 7,292,009 | B2 * | 11/2007 | Kawakami et al. | 322/29 |
| 7,294,991 | B2 * | 11/2007 | Kimura et al. | 322/37 |
| 7,317,259 | B2 * | 1/2008 | Yamauchi | 290/40 C |
| 7,330,015 | B2 * | 2/2008 | Takase et al. | 322/28 |
| 7,332,895 | B2 * | 2/2008 | Wei | 322/44 |
| 7,336,000 | B2 * | 2/2008 | Stahlhut et al. | 290/52 |
| RE40,164 | E * | 3/2008 | Kuang et al. | 290/40 C |
| 7,355,292 | B2 * | 4/2008 | Yamashita | 290/40 C |
| 7,358,705 | B2 * | 4/2008 | Maehara | 322/27 |
| 7,365,443 | B2 * | 4/2008 | Gendron | 290/40 C |
| 7,365,518 | B2 * | 4/2008 | Wiseman | 322/28 |
| 7,365,520 | B2 * | 4/2008 | Tsuzuki | 322/28 |
| 7,368,892 | B2 * | 5/2008 | Uematsu et al. | 322/27 |
| 7,368,893 | B2 * | 5/2008 | Tsuzuki | 322/28 |
| 7,372,174 | B2 * | 5/2008 | Jones et al. | 290/44 |
| 2002/0011811 | A1 * | 1/2002 | Chen et al. | 318/254 |
| 2002/0193922 | A1 * | 12/2002 | Taniguchi et al. | 701/29 |
| 2004/0008008 | A1 * | 1/2004 | Uematsu et al. | 322/28 |
| 2005/0174088 | A1 * | 8/2005 | Tanimoto | 318/807 |
| 2006/0091864 | A1 * | 5/2006 | Watanabe et al. | 322/28 |
| 2006/0139012 | A1 * | 6/2006 | Iwatani et al. | 322/28 |
| 2006/0186863 | A1 * | 8/2006 | Yamamoto et al. | 322/28 |
| 2007/0085510 | A1 * | 4/2007 | Asada | 322/28 |
| 2007/0085512 | A1 * | 4/2007 | Maehara | 322/28 |
| 2007/0247119 | A1 * | 10/2007 | Maehara | 322/28 |
| 2008/0018111 | A1 * | 1/2008 | Yaguchi | 290/40 B |
| 2008/0030208 | A1 * | 2/2008 | Aratani | 324/713 |
| 2008/0084190 | A1 * | 4/2008 | Harmon et al. | 322/28 |
| 2008/0084191 | A1 * | 4/2008 | Harmon et al. | 322/28 |
| 2008/0088282 | A1 * | 4/2008 | Inokuchi et al. | 322/28 |
| 2008/0093851 | A1 * | 4/2008 | Maeda et al. | 290/40 A |
| 2008/0093864 | A1 * | 4/2008 | Kagoshima et al. | 290/40 A |
| 2008/0094034 | A1 * | 4/2008 | Takahashi et al. | 320/134 |
| 2008/0094039 | A1 * | 4/2008 | Oshima | 322/28 |
| 2008/0100269 | A1 * | 5/2008 | Sasaki et al. | 322/28 |
| 2008/0116695 | A1 * | 5/2008 | Peterson | 290/40 C |
| 2008/0122228 | A1 * | 5/2008 | Liu et al. | 290/40 C |
| 2008/0122408 | A1 * | 5/2008 | Keiter et al. | 322/28 |
| 2008/0129255 | A1 * | 6/2008 | Holguin | 322/28 |
| 2008/0133064 | A1 * | 6/2008 | Basic et al. | 700/287 |

FOREIGN PATENT DOCUMENTS

JP      A 2003-284257      10/2003

* cited by examiner

VEHICLE-GENERATOR CONTROL DEVICE

CROSS-REFERENCE TO RELATED APPLICATION

This application is related to Japanese Patent Application No. 2005-299965 filed on Oct. 14, 2005, the contents of which are hereby incorporated by reference.

BACKGROUND OF THE INVENTION

1. Field of the Invention

The present invention relates to a control device for controlling an output voltage of a vehicle generator mounted on a vehicle such as a passenger car or a truck.

2. Description of Related Art

In recent years, there is tendency that an engine idle speed is set at a lower value for the purpose of reducing fuel consumption of a vehicle. However, since an output torque of a vehicle engine decrease with its rotational speed, the stability of an idle speed of the vehicle engine is largely affected by drive torque fluctuations of auxiliaries including a vehicle generator belt-driven by the vehicle engine when the engine idle speed is set at a low value. Accordingly, there is known a vehicle-generator control device configured to calculate a power generation torque of a vehicle generator on the basis of an excitation current and rotational speed of the vehicle generator, and to control the excitation current such that an increasing rate of the power generation torque does not exceed a predetermined value, to thereby stabilize the engine idle speed, as disclosed, for example, in Japanese Patent Application Laid-open No. 2003-284257.

However, such a prior art control device has a problem in that undesirable undershoot or overshoot often occurs when a vehicle engine is running at an idle speed, because it cannot detect the excitation current of a vehicle generator at a sufficiently high accuracy, and accordingly the power generation torque of the vehicle generator cannot be detected at a sufficiently high accuracy. In addition, also an output current of the vehicle generator cannot be detected at a sufficiently high accuracy by use of the detected excitation current.

SUMMARY OF THE INVENTION

The present invention provides a vehicle-generator control device for controlling an output voltage of a vehicle generator by on/off-controlling an excitation current flowing into an excitation winding of the vehicle generator, including:

an excitation current detecting circuit detecting an excitation current flowing into the excitation winding; and a computation circuit having a first function of correcting the excitation current detected by the excitation current detecting circuit on the basis of a current flowing into an electrical load applied with the output voltage of the vehicle generator, and a second function of calculating an output current of the vehicle generator on the basis of the excitation current.

According to the present invention, in which the excitation current detected by the excitation current detecting circuit is corrected, the accuracy of the value of the output current calculated by use of the value of the excitation current can be improved. In addition, also the accuracy of the calculation of the power generation torque of the vehicle generator performed by use of the excitation current can be improved. Using the accurate power generation torque makes it possible to perform the excitation current control with less undershoot and overshoot in the idle speed region.

The electric load may be a vehicle battery charged by the vehicle generator, and the first function may be configured to correct the excitation current detected by the excitation current detecting circuit on the basis of a variation of a battery current of the vehicle battery when the excitation current is varied by a predetermined amount.

The first function may be configured to correct the excitation current detected by the excitation current detecting circuit on the basis of the variation of the battery current, and a variation of the output current calculated by the second function when the excitation current is varied by the predetermined amount.

If a load current of the electric load is known, the first function may be configured to correct the excitation current detected by the excitation current detecting circuit on the basis of a variation of the output current calculated by the second function when the excitation current is varied by a predetermined amount, and the known load current of the electric load.

The second function may be configured to calculate the output current of the vehicle generator on the basis of the excitation current corrected by the first function, a rotational speed of the vehicle generator, and the output voltage of the vehicle generator, and the computation circuit may be configured to store a correction amount of the excitation current in a memory circuit.

The memory circuit may include a nonvolatile memory.

The computation circuit may further include a third function of calculating a power generation torque of the vehicle generator on the basis of the excitation current corrected by the first function, and may be configured to limit the excitation current to such a value that an increasing rate of the calculated power generation torque does not exceed a predetermined value.

Other advantages and features of the invention will become apparent from the following description including the drawings and claims.

PREFERRED EMBODIMENTS OF THE INVENTION

Figure 1:
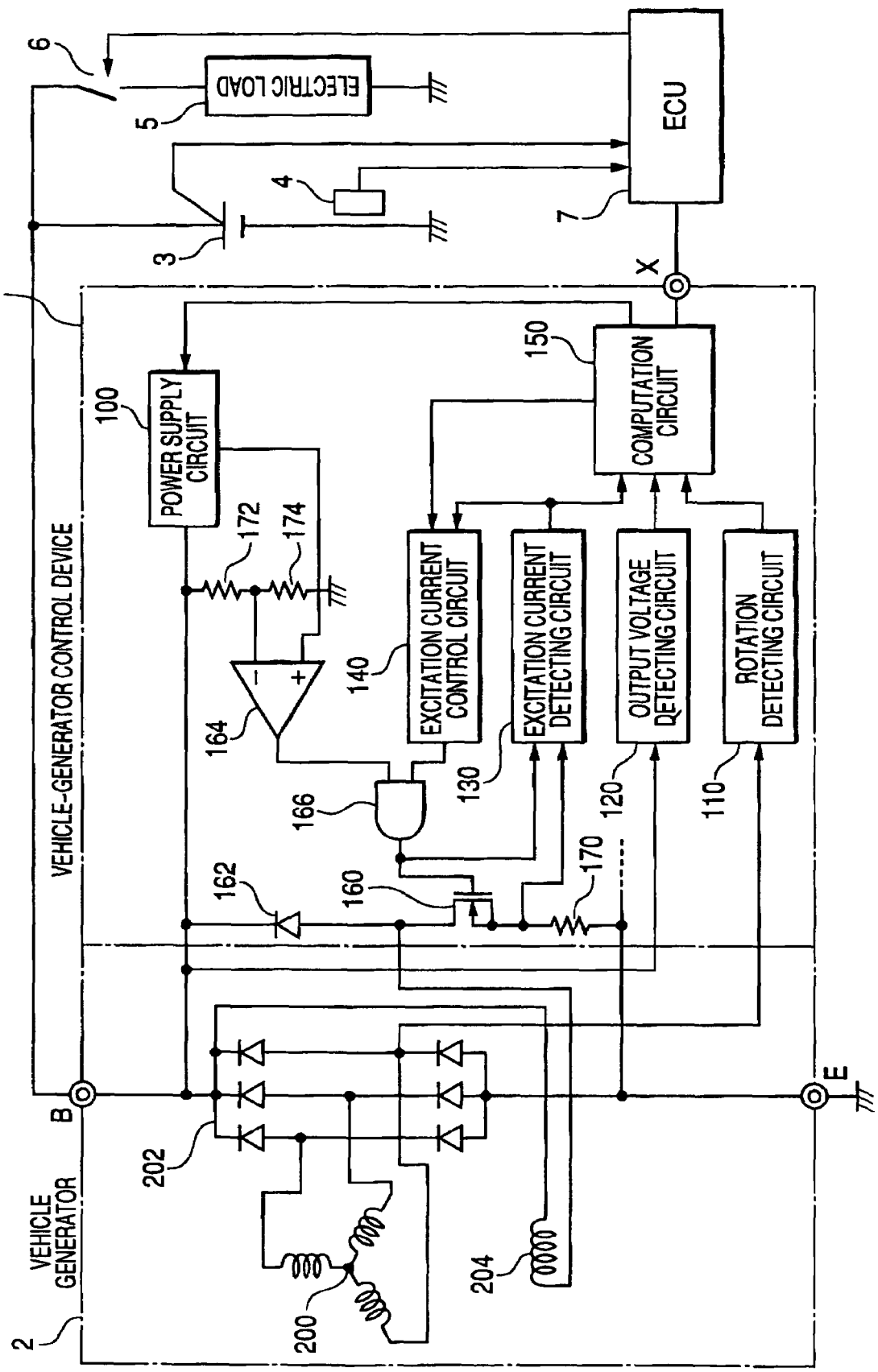
FIG. 1 is a block diagram showing a structure of a vehicle-generator control device according to a first embodiment of the invention connected to a vehicle generator, an ECU (Electronic Control Unit), and a battery.

FIG. 1 is a block diagram showing a structure of a vehicle-generator control device 1 according to a first embodiment of the invention, which is connected to a vehicle generator 2, an ECU (Electronic Control Unit) 7, and a battery 3.

The vehicle-generator control device 1 operates to regulate a voltage at an output terminal (B-terminal) of the vehicle generator 2 at a predetermined target regulation voltage (14 V, for example). The vehicle-generator control device 1 has a communication terminal (X-terminal), and a ground terminal (E-terminal) in addition to the B-terminal. The X-terminal is connected to the ECU 7 through a communication cable. The E-terminal is connected to a frame of the vehicle generator 2.

The ECU 7, which is for performing overall control of a vehicle including an engine speed control, is configured to transmit a key-on signal to the vehicle-generator control device 1 when a key switch (not shown) is turned on. The ECU 7 is connected to a current sensor 4 detecting a charging/discharging current (battery current) of the battery 3, and configured to transmit a battery current signal indicative of a value of the battery current to the vehicle-generator control device 1. The B-terminal of the vehicle generator 2 is connected to an electric load 5 whose load current is known through a relay 6 which is on/off controlled by the ECU 7.

The vehicle generator 2 includes a stator around which a three-phase stator winding is wound, a rectifier circuit for full-wave rectifying a three-phase output of the stator winding 200, and a rotor around which an excitation winding 204 is wound. The output voltage of the vehicle generator 2 is regulated through on/off control of the passage of a current to the excitation winding 204 by the vehicle-generator control device 1. The B-terminal of the vehicle generator 2 is connected to the battery 3, and electric loads including the electric load 5 through a power supply cable 8. The charging current of the battery 3 and operating currents of the electric loads are supplied from the B-terminal.

Next, a detailed structure and operation of the vehicle-generator control device 1 are explained. As shown in FIG. 1, the vehicle-generator control device 1 includes a power supply circuit 100, a rotation detecting circuit 110, an output voltage detecting circuit 120, an excitation current detecting circuit 130, an excitation current control circuit 140, a computation circuit 150, a power transistor 160, a fly-wheel diode 162, a voltage comparator 164, an AND circuit 166, and resistors 170, 172, 174.

The power supply circuit 100 generates a predetermined operation voltage when it receives a start command from the computation circuit 150. The rotation detecting circuit 110 monitors a phase voltage of one of the three-phase coils of the stator winding 200 to detect a rotational speed of the vehicle generator 2. The output voltage detecting circuit 120 detects the output voltage (B-terminal voltage) of the vehicle generator 2. The output voltage detecting circuit 120, which may be constituted by an A/D converter circuit, outputs digital data indicative of the value of the output voltage to the computation circuit 150. The excitation current detecting circuit 130 detects the excitation current flowing into the excitation winding 204 on the basis of the voltage at the source side of the power transistor 160 constituted by an n-channel MOSFET. The resistor 170 is connected to the source side of the of the power transistor 160 as a sense resistor for detecting the excitation current. The excitation current detecting circuit 130 detects the excitation current on the basis of a voltage drop across the resistor 170 due to the excitation current flowing into the excitation winding through the source-drain channel of the power transistor 160 and this resistor 170.

The excitation current control circuit 140 generates an excitation current control signal in order to control the excitation current below an excitation-current maximum limit MAX determined by the computation circuit 150. The computation circuit 150 estimates the power generation torque and the output current of the vehicle generator 2 on the basis of the rotational speed of the vehicle generator 2 detected by the rotation detecting circuit 110, the output voltage of the vehicle generator 2 detected by the output voltage detecting circuit 120, and the excitation current detected by the excitation current detecting circuit 130. The computation circuit 150 also determines the excitation-current maximum limit MAX for this moment in order to limit the increase of the power generation torque. The computation circuit 150 has a function of performing communication with the ECU 7 through the communication terminal X to receive the battery current signal and the key-on signal from the ECU 7.

The excitation current flows into the excitation winding 204 when the power transistor 160 series-connected to the excitation winding 204 is in the on state. The fly-wheel diode 162 parallel-connected to the excitation winding 204 is for circulating a current appearing when the power transistor 160 is turned off. The voltage comparator 164 is applied with the output voltage of the vehicle generator 2 which has been divided down by a voltage dividing circuit constituted by the resistors 172, 174 at its negative input terminal and applied with a reference voltage generated by the power supply circuit 100 at its positive input terminal. When the divided output voltage of the vehicle generator 2 becomes lower than the reference voltage, that is, when the output voltage of the vehicle generator 2 becomes lower than the target regulation voltage, an output signal of the voltage comparator 164 becomes high level.

The AND circuit 166 receives the excitation current control signal outputted from the excitation current control circuit 140, and the output signal of the voltage comparator 164, and outputs a logical product of these signals as a drive signal from its output terminal connected to the gate of the power transistor 166. The power transistor 160 is in the on state when the drive signal outputted from the AND circuit 166 is in high level.

Figure 2:
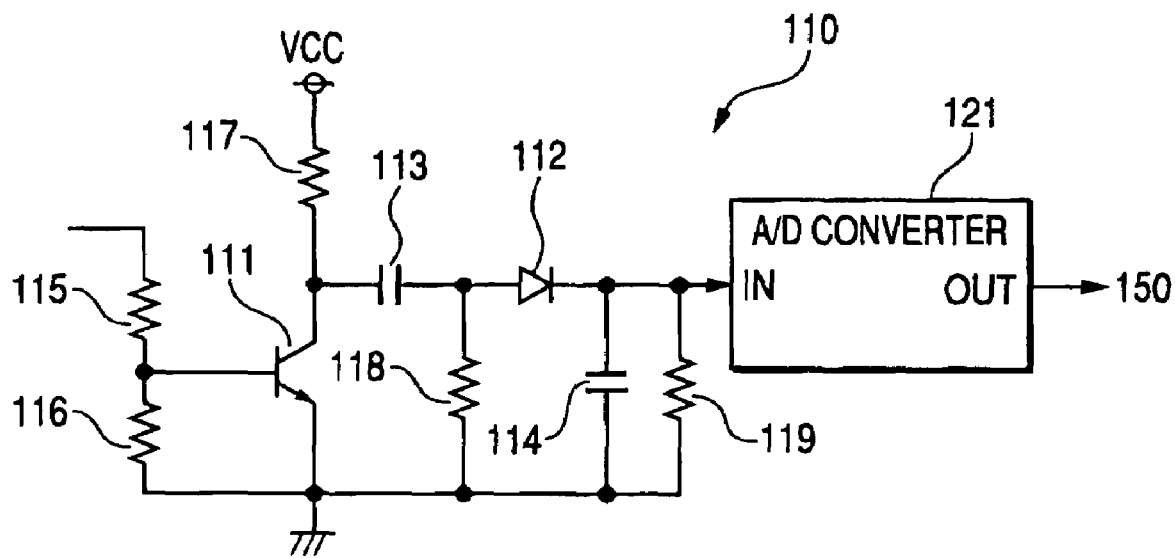
FIG. 2 is a circuit diagram of a rotation detecting circuit included in the vehicle-generator control device shown in FIG. 1.

FIG. 2 is a circuit diagram of the rotation detecting circuit 110. As shown in this figure, the rotation detecting circuit 110 includes a transistor 111, a diode 112, capacitors 113, 114, resistors 115-119, and an A/D (Analog-to-Digital) converter 121. One of the phase voltages of the stator winding 200 is divided down by a voltage dividing circuit constituted by the resistors 115, 116, and applied to the base of the transistor 111. The transistor 111 and the resistor 117 connected to the collector of the transistor 111 constitute a waveform-shaping circuit. The divided phase voltage is wave-form shaped by this waveform shaping circuit, and outputted from the collector of the transistor 111. This signal is inputted to a differentiating circuit constituted by the capacitor 113 and the resistor 118. The differential output of this differentiating circuit is rectified by the diode 112, and then inputted to a charging/discharging circuit constituted by the capacitor 114 and the resistor 119. In this way, a voltage proportional to the frequency of the phase voltage of the stator winding 200 is inputted to the A/D converter circuit 121. The A/D converter circuit 121 converts this voltage into digital data including a certain number of bits (8 bits, for example).

Figure 3:
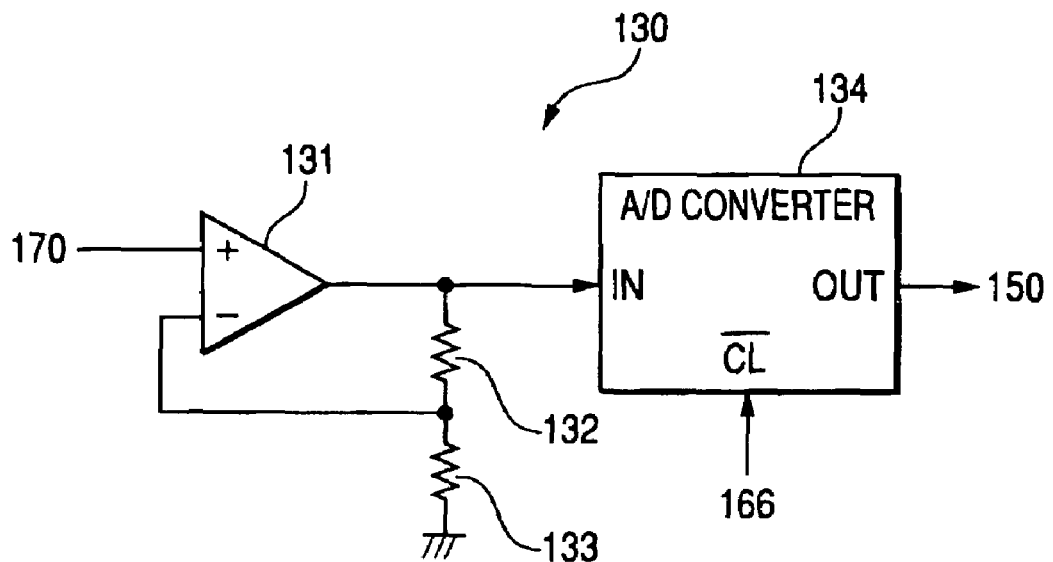
FIG. 3 is a circuit diagram of an excitation current detecting circuit included in the vehicle-generator control device shown in FIG. 1.

FIG. 3 is a circuit diagram of the excitation current detecting circuit 130. As shown in this figure, the excitation current detecting circuit 130 includes an operational amplifier 131, resistors 132, 133, and an A/D converter circuit 134. The operational amplifier 131 and the resistors 132, 133 constitute an amplifier having a gain determined by the resistances of the resistors 132, 133. An input voltage having a value depending on the value of the excitation current is amplified by this amplifier. The A/D converter circuit 134 receives an output voltage of this amplifier at its input terminal IN, and the drive signal outputted from the AND circuit 166 at its clock terminal CL. The A/D converter circuit 134 is configured to take in the output voltage of the amplifier at a timing when the drive signal changes from high level to low level, and converts it into digital data having a certain number of bits (8 bits for example).

Figure 4:
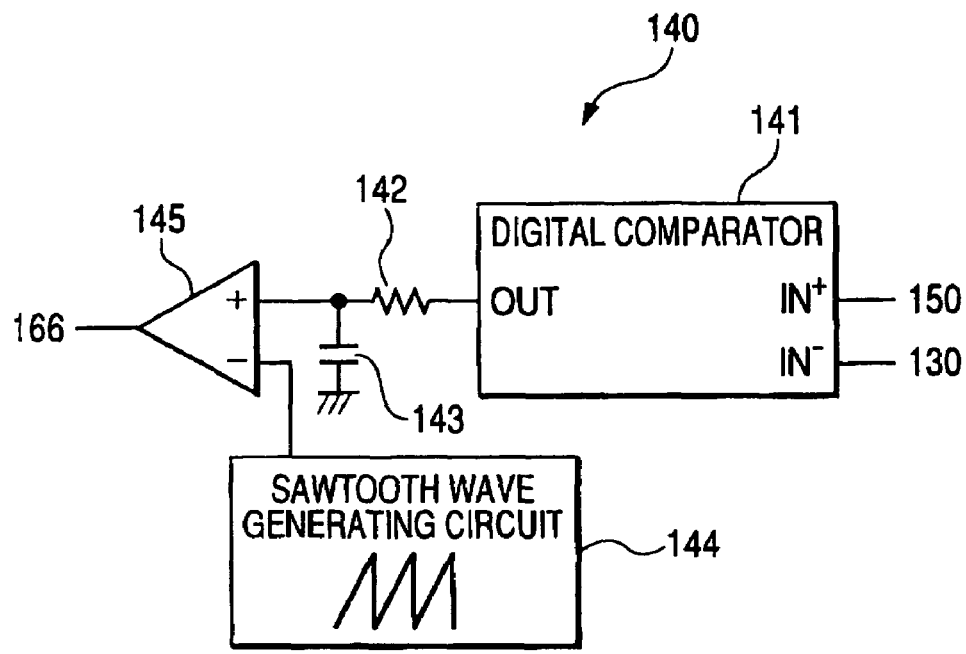
FIG. 4 is a circuit diagram of an excitation current control circuit included in the vehicle-generator control device shown in FIG. 1.

FIG. 4 is a circuit diagram of the excitation current control circuit 140. As shown in this figure, the excitation current control circuit 140 includes a digital comparator 141, a resistor 142, a capacitor 143, a sawtooth wave generating circuit 144, and a voltage comparator 145. The digital comparator 141 outputs a high-level signal when digital data indicative of the value of the excitation-current maximum limit MAX outputted from the computation circuit 150 and received at one input terminal IN+ thereof is larger than the digital data indicative of the value of the excitation current outputted from the excitation current detecting circuit 130 and received at the other input terminal IN− thereof. A smoothing circuit constituted by the resistor 142 and the capacitor 143 smoothes the high-level output signal to generate a voltage signal. This voltage signal is inputted to a positive input terminal of the voltage comparator 145. The voltage comparator 145 compares this voltage signal received at its positive input terminal with the sawtooth wave signal outputted from the sawtooth wave generating circuit 144 and received at its negative input terminal, and outputs a PWM signal having a duty ratio in accordance with the comparison result.

Figure 5:
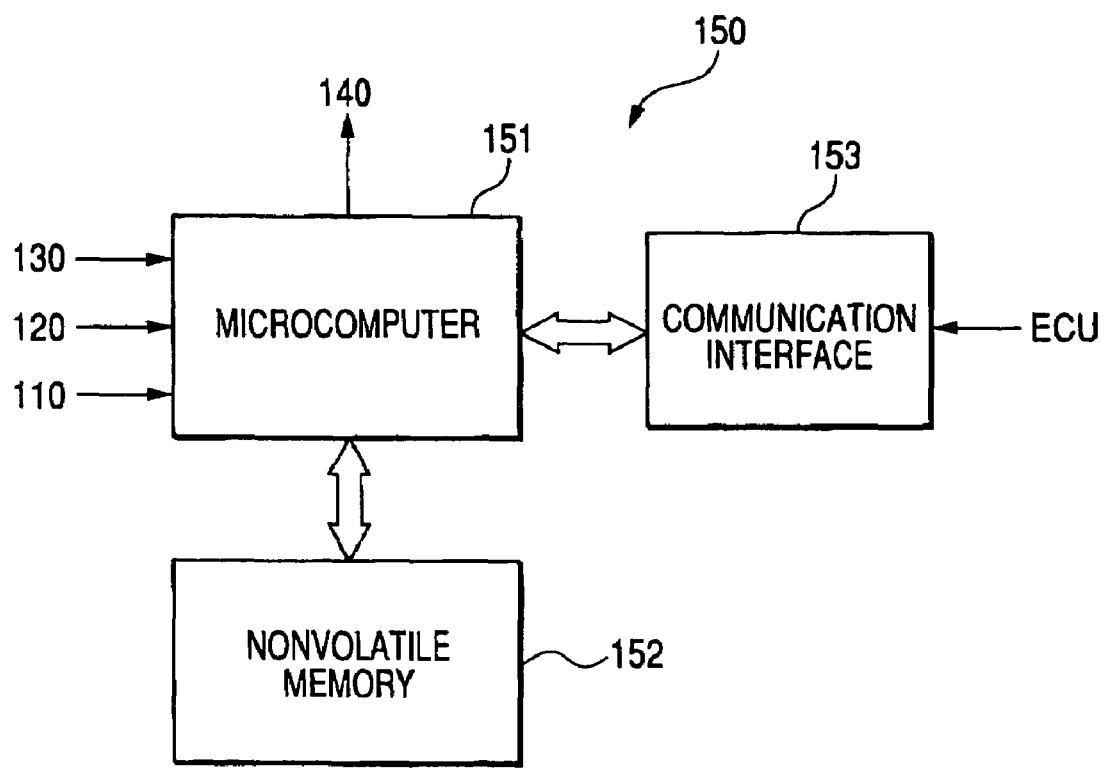
FIG. 5 is a block diagram of a computation circuit included in the vehicle-generator control device shown in FIG. 1.

FIG. 5 is a block diagram of the computation circuit 150. As shown in this figure, the computation circuit 150 includes a microcomputer 151, a nonvolatile memory 152, and a communication interface 153. The rotational speed (the number of rotations per unit time) N of the vehicle generator 2 detected by the rotation detecting circuit 110, the output voltage of the vehicle generator 2 detected by the output voltage detecting circuit 120, and the value of the excitation current detected by the excitation current detecting circuit 130 are inputted to the microcomputer 151, so that the microcomputer 151 can calculate the power generation torque of the vehicle generator 2 with reference to a torque calculating table stored in the nonvolatile memory 152, and set the excitation-current maximum limit MAX at such a value that an increasing rate of the power generation torque does not exceed a predetermined value.

The torque calculating table shows relationships among the excitation current If, the rotational speed N, the output voltage $V_B$, and the power generation torque T of the generator 2. Using this torque calculating table makes it possible to obtain the power generation torque T when the excitation current $I_f$, the rotational speed N and the output voltage $V_B$ are known, and to obtain the excitation current $I_f$ when the rotational speed N, the output voltage $V_B$ and the power generation torque T are known. The microcomputer 151 also calculates the output current $I_{ALT}$ of the vehicle generator 2 on the basis of the rotational speed N, the output voltage and the excitation current with reference to an output current calculating table stored in the nonvolatile memory 152. Since the contents of the torque calculating table and the output current calculating table are dependent on the performance specifications of the vehicle generator 2, they are electrically written into the nonvolatile memory 152 at the time of testing the vehicle generator 2 or the vehicle-generator control device 1.

The microcomputer 151 also executes a learning process with respect to the value of the excitation current detected by the excitation current detecting circuit 130, in order to determine a correction coefficient K. Once the learning process is executed, the determined correction coefficient K is stored in the nonvolatile memory 152. After that, the microcomputer 151 corrects the value of the excitation current detected by the excitation current detecting circuit 130 by multiplying it by the correction coefficient K, and calculates the power generation torque T and the output current $I_{ALT}$ by use of the corrected value of the excitation current. The communication interface 153 is for performing transmission and reception of various signals with the ECU 7 through the X-terminal. For example, the communication interface 153 receives the battery current signal and key-on signal transmitted from the ECU 7.

The vehicle-generator control device 1 of this embodiment having the above explained structure operates as follows.

(1) Before the Engine is Started.

When the key switch is turned on by a driver of the vehicle, the ECU 7 starts to operate, and as a result the key-on signal is transmitted to the vehicle-generator control device 1. The computation circuit 150 of the vehicle-generator control device 1 sends a start command to the power supply circuit 100 in response to this key-on signal. In consequence, the power supply circuit 100 starts to generate an operation voltage so that the vehicle-generator control device 1 can perform its control operation. Before the engine is started, since the rotor of the vehicle generator 2 is not driven to rotate by this engine, and accordingly the terminal voltage of the battery 3 is about 12 V which is lower than the target regulation voltage (14 V, for example), the output signal of the voltage comparator 164 is at high level.

While the rotational speed N of the vehicle generator 2 is lower than a certain idle speed (800 rpm, for example), the computation circuit 150 sets the excitation-current maximum limit MAX at such a value that the duty ratio of the excitation current which is on/off controlled by the power transistor 160 is limited to 25%. This state is referred to as "initial excitation mode" hereinafter.

(2) When the Engine is in an Idle State

When the engine reaches the idle speed, the generator 2 starts to generate power. During a period immediately after the engine is started, since the vehicle generator 2 has to supply operation currents to normal loads and also a relatively large charging current to the battery 3, the vehicle generator 2 cannot generate sufficient power with the excitation current having the duty ratio of as small as 25%, and accordingly the output voltage of the vehicle generator 2 remains below the target regulation voltage.

In such a state, the computation circuit 150 starts a torque suppression control, in which the power generation torque T is calculated, the excitation-current maximum limit MAX is set at such a value that the increasing rate of this power generation torque T does not exceed a predetermined value, and the excitation current If limited not to exceed the excitation-current maximum limit MAX is supplied. In consequence, the duty ratio of the excitation current $I_f$ gradually exceeds from 25%, and accordingly the power generation torque T gradually increases until the output voltage $V_B$ reaches the target regulation voltage. As a result, the idling state during the period immediately after the engine is started is stabilized.

After that, if the output voltage $V_B$ exceeds the target regulation voltage, the output signal of the voltage comparator 164 changes to low level causing the drive signal outputted from the AND circuit 166 to change to low level, as a result of which the power transistor 160 is turned off to decrease the output voltage $V_B$.

As explained above, during the idling state, if the electric loads and rotational speed N of the vehicle generator 2 are stable, the excitation-current maximum limit MAX is set to a value slightly larger than the value of the actual excitation current $I_f$, so that the output voltage $V_B$ is regulated at the target regulation voltage without affected by the excitation-current maximum limit MAX.

If a large electric load is thrown on the vehicle generator 2 when the vehicle is in the idling state, the terminal voltage of the battery 3 drops momentarily. At this time, the output signal of the voltage comparator 164 is kept at high level, however, the excitation current $I_f$ is limited below the excitation-current maximum limit MAX. This makes it possible to prevent the power generation torque from increasing rapidly, and accordingly to prevent the engine speed from dropping largely. After that, as the excitation-current maximum limit MAX increases with the regular increase of a torque maximum limit TMAX corresponding to the excitation-current maximum limit MAX, the output voltage $V_B$ returns to the target regulation voltage.

The computation circuit 150 executes a learning process with respect to the excitation current detection as a main routine process at regular intervals (every 5 ms, for example), and also a power generation torque calculating process for determining the excitation-current maximum limit MAX at regular intervals (every 1 ms, for example) as a subroutine process.

Next, the power generation torque calculating process is explained with reference to the flowchart shown in FIG. 6. When the detected signals of the excitation current $I_f$, the rotational speed N, and the output voltage $V_B$ are inputted to microcomputer 1 at step S100, the microcomputer 151 calculates at step S101 the output current of the vehicle generator 2 with reference to the output current calculating table stored in the nonvolatile memory 152, and also calculates at step S102 the power generation torque of the vehicle generator 2 with reference to the torque calculating table stored in the nonvolatile memory 152. This process is repeated every 1 ms. The calculated output current IALT and the calculated power generation torque T are stored in the microcomputer 151 every time this process is executed. The stored power generation torque T is used for determining the excitation-current maximum limit MAX.

Next, the learning process of the excitation current detection is explained with reference to the flowchart shown in FIG. 7. The microcomputer 151 checks at step S200 whether or not this learning process is unexecuted. If the check result at step S200 is negative, this process is ended. If the check result at step S200 is affirmative, the process moves to step S201 where the microcomputer 51 checks whether or not the engine idle speed is stable (±50 rpm for 5 seconds, for example). If the check result at step S201 is negative, this process is ended. If the check result at step S201 is affirmative, the process moves to step S202 where the microcomputer 151 obtains, from the ECU 7, an output current $I_{ALT1}$, calculated by the subroutine process shown in FIG. 6, a detected excitation current $I_{f1}$, and also a battery current $I_{bat1}$, detected by the current sensor 4.

Subsequently, the microcomputer 151 changes at step S203 the excitation current by sending a commanded excitation current $I_{f2}$ having a value different from that of the detected excitation current $I_{f1}$. At the following step S204, the microcomputer 151 obtains an output current $I_{ALT2}$ corresponding to the commanded excitation current $I_{f2}$, and a battery current $I_{bat2}$ detected by the current sensor 4 at this time. The calculation of the output current $I_{ALT2}$ is performed by using the value of the excitation current detected by the excitation current detecting circuit 130 after the excitation current is changed.

Next, the microcomputer 151 calculates at step S205 a correction coefficient K used for correcting the value of the excitation current. A change amount of the output current of the vehicle generator 2 is in good agreement with a change amount of the battery current if the total value of the electric loads is constant. The microcomputer 151 calculates the battery current change amount $\Delta I_{bat}=I_{bat2}-I_{bat1}$, and the output current change amount $\Delta I_{ALT}=I_{ALT2}-I_{ALT1}$ by use of the data obtained at steps S202, S204, and then calculates the correction coefficient $K=\Delta I_{bat}/\Delta I_{ALT}$. Thereafter, the calculation of the power generation torque T and the calculation of the output current $I_{ALT}$ are performed by using the excitation current $I_f$ corrected by multiplying the excitation current $I_f$ by the correction coefficient K.

By correcting the excitation current detected by the excitation current detecting circuit 130, the accuracy of the value of the output current calculated by use of the value of the excitation current can be improved. In addition, also the accuracy of the calculation of the power generation torque of the vehicle generator 2 performed by use of the excitation current can be improved. Using the accurate power generation torque makes it possible to perform the excitation current control with less undershoot and overshoot in the idle speed region. By comparing the calculated value of the output current of the vehicle generator 2 with the actually detected value of the battery current, the excitation current correction can be performed with high accuracy. By storing the correction result of the excitation current in an appropriate memory circuit, the excitation current correction process from then on can be simplified. By using the nonvolatile memory 152 as such a memory circuit, the correction result can be held after the engine is stopped. This makes it possible to further simplify the excitation current correction process, because the correction result can be utilized when the key switch is turned on next.

It is a matter of course that many modifications can be made to the above described embodiment. For example, although the battery current is detected for performing the learning process of the excitation current detection in the above described embodiments, a turn on/off operation of the electric load 5 may be performed if the load current of the electric load 5 is known, as described below.

Figure 7:
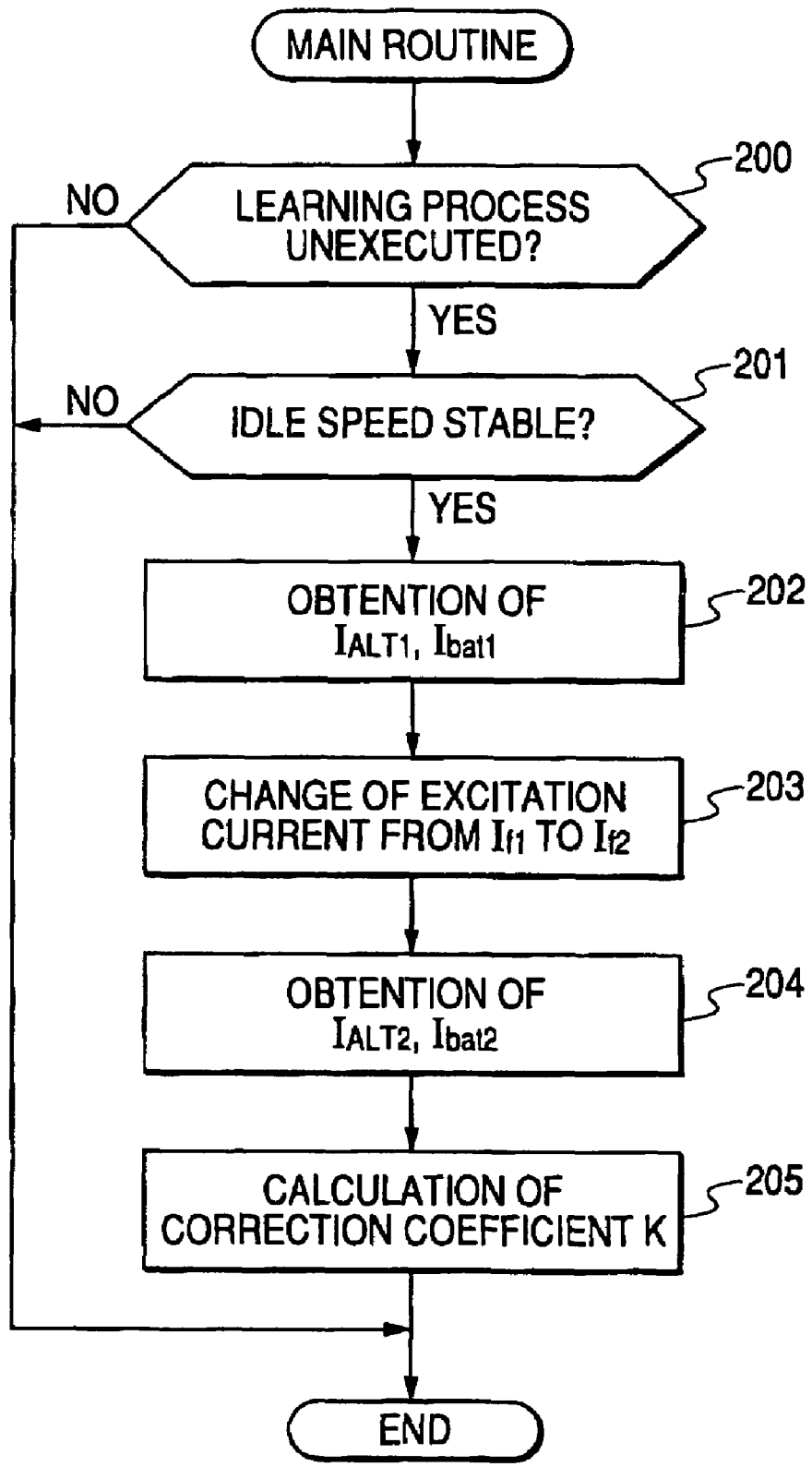
FIG. 7 a flowchart showing a flow of a learning process of excitation current detection executed as a main routine process.
Figure 8:
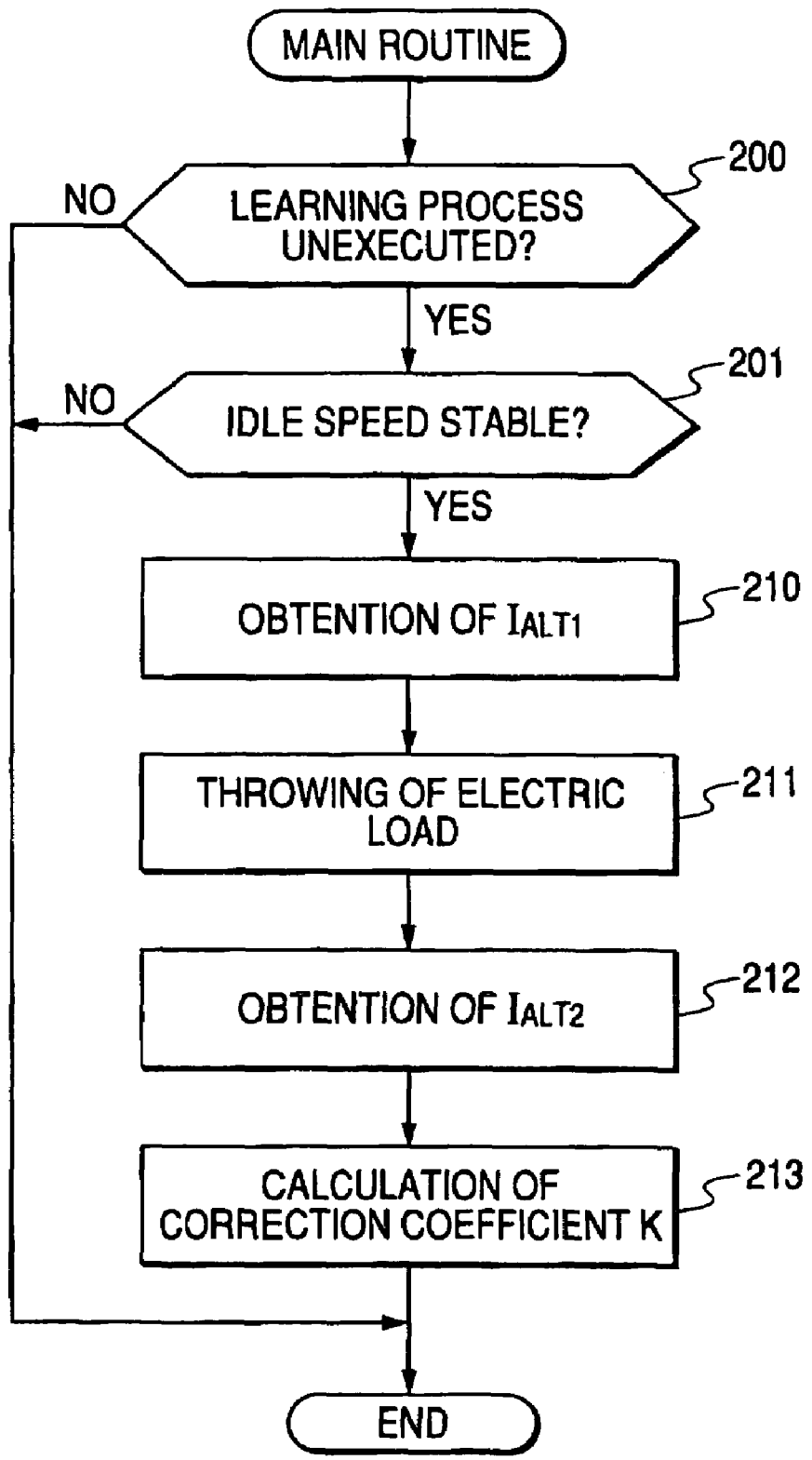
FIG. 8 is a flowchart showing a flow of another learning process of excitation current detection executed as a main routine process.

FIG. 8 is a flowchart showing a flow of another learning process of the excitation current detection executed as the main routine process. The operations of step S200 and step S201 are identical with those in the flowchart shown in FIG. 7.

Figure 6:
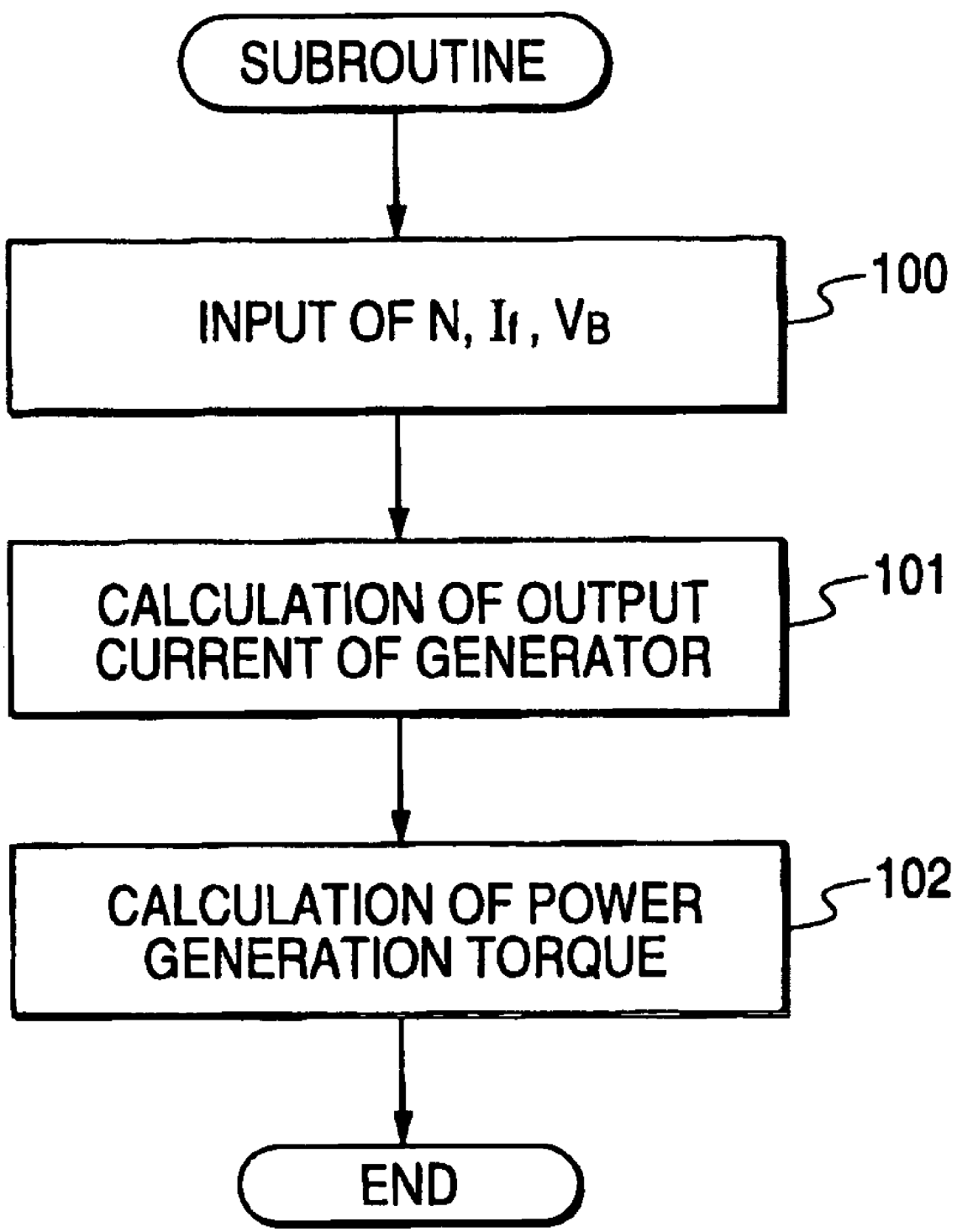
FIG. 6 is a flowchart showing a flow of a power generation torque calculating process executed as a subroutine process.

At step S210, the microcomputer 151 obtains the output current $I_{ALT1}$ calculated by the subroutine process shown in FIG. 6. At this time, the relay 6 is in an opened state, and accordingly the electric load 5 is not connected to the power supply cable 8 connected to the battery 3 and the output terminal B of the generator 2. At following step S211, the microcomputer 151 closes the relay 6 to connect the electric load 5 to the power supply cable 8. Subsequently, the microcomputer 151 obtains at step S212 similar to step S210 the output current $I_{ALT2}$ of the vehicle generator 2 after the electric load 5 is connected to the power supply cable 8.

After that, the microcomputer 151 calculates at step S213 the correction coefficient K used for correcting the excitation current. A load variation $\Delta I_{LOAD}$ caused by connecting the electric load 5 to the power supply cable 8 is given. The microcomputer 151 calculates the correction coefficient $K=\Delta I_{LOAD}/\Delta I_{ALT}$ by use of the battery current variation $\Delta I_{bat}=I_{bat2}-I_{bat1}$ obtained through step 211 and step S212, and the load variation $\Delta I_{LOAD}$. Thereafter, the calculation of the power generation torque T is performed by using the excitation current $I_f$ obtained by multiplying the excitation current $I_f$ by the correction coefficient K.

The above explained preferred embodiments are exemplary of the invention of the present application which is described solely by the claims appended below. It should be understood that modifications of the preferred embodiments may be made as would occur to one of skill in the art.

What is claimed is:

1. A vehicle-generator control device for controlling an output voltage of a vehicle generator by on/off-controlling an excitation current flowing into an excitation winding of said vehicle generator, comprising:
    a first function of detecting said excitation current, a rotational speed of said vehicle generator, and an output voltage of said vehicle generator;
    a second function of calculating an output current and a power generation torque of said vehicle generator on the basis of said excitation current, said rotational speed of said vehicle generator, and said output voltage of said vehicle generator detected by said first function;
    a third function of limiting said excitation current to such a value that an increasing rate of said calculated power generation torque does not exceed a predetermined value;
    a fourth function of detecting a current flowing into an electrical load applied with said output voltage of said vehicle generator; and
    a fifth function of calculating, within a period during which an idle speed of said vehicle engine is stable, a correction coefficient of said excitation current on the basis of said output current of said vehicle generator and said current flowing into said electrical load, said second function being configured to correct said excitation current detected by said first function depending on said correction coefficient to improve calculation accuracy of said output current and said power generation torque of said vehicle generator.

2. The vehicle-generator control device according to claim 1, wherein said electric load is a vehicle battery charged by said vehicle generator, and said fifth function is configured to calculate said correction coefficient on the basis of a variation of a battery current of said vehicle battery when said excitation current is varied by a predetermined amount.

3. The vehicle-generator control device according to claim 2, wherein said fifth function is configured to calculate said correction coefficient on the basis of said variation of said battery current, and a variation of said output current calculated by said second function when said excitation current is varied by said predetermined amount.

4. The vehicle-generator control device according to claim 1, wherein a load current of said electrical load is known, and said fifth function is configured to calculate said correction coefficient on the basis of a variation of said output current calculated by said second function when said excitation current is varied by a predetermined amount, and said known load current of said electric load.

5. The vehicle-generator control device according to claim 1, wherein said correction coefficient calculated by said fifth function is stored in a nonvolatile memory included in said vehicle-generator control device.

6. The vehicle-generator control device according to claim 1, further comprising a sixth function of performing communication with outside to obtain a value of said current flowing into said electrical load and a value of said engine idle speed.

7. A vehicle-generator control device for controlling an output voltage of a vehicle generator by on/off-controlling an excitation current flowing into an excitation winding of said vehicle generator, comprising:
    an excitation current detecting circuit detecting an excitation current flowing into said excitation winding; and
    a computation circuit having a first function of correcting said excitation current detected by said excitation current detecting circuit on the basis of a current flowing into an electrical load applied with said output voltage of said vehicle generator, and a second function of calculating an output current of said vehicle generator on the basis of said excitation current,
    wherein said electrical load is a vehicle battery charged by said vehicle generator, and said first function is configured to correct said excitation current detected by said excitation current detecting circuit on the basis of a variation of a battery current of said vehicle battery and a variation of said output current calculated by said second function when said excitation current is varied by a predetermined amount.

* * * * *